(12) United States Patent
Mantell et al.

(10) Patent No.: US 8,482,801 B2
(45) Date of Patent: Jul. 9, 2013

(54) STORAGE OF STAMP INFORMATION FOR ERROR DIFFUSION

(75) Inventors: David Allen Mantell, Rochester, NY (US); John Adam Handwork, Clackamas, OR (US); David Metcalfe, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 920 days.

(21) Appl. No.: 12/100,643

(22) Filed: Apr. 10, 2008

(65) Prior Publication Data
US 2009/0257092 A1    Oct. 15, 2009

(51) Int. Cl.
H04N 1/407    (2006.01)
G06K 15/00    (2006.01)

(52) U.S. Cl.
USPC .......... 358/3.03; 358/474; 358/1.16; 358/1.9; 358/3.05; 358/3.06; 358/3.13; 358/3.04; 358/534; 382/162; 382/251; 382/252; 347/131; 347/225; 347/250

(58) Field of Classification Search
USPC .................. 358/3.03, 505, 1.16; 382/162
See application file for complete search history.

(56) References Cited

U.S. PATENT DOCUMENTS

| | | | |
|---|---|---|---|
| 5,226,094 A | 7/1993 | Eschbach | |
| 5,374,997 A | 12/1994 | Eschbach | |
| 5,535,019 A | 7/1996 | Eschbach | |
| 5,917,614 A | 6/1999 | Levien | |
| 5,920,656 A * | 7/1999 | Gahang | 382/274 |
| 6,160,921 A | 12/2000 | Marcu | |
| 7,317,556 B2 | 1/2008 | Mantell | |
| 2003/0043423 A1* | 3/2003 | Johnston et al. | 358/505 |
| 2004/0017589 A1* | 1/2004 | Wang | 358/461 |
| 2005/0134920 A1 | 6/2005 | Mantell | |
| 2005/0134921 A1* | 6/2005 | Mantell | 358/3.03 |
| 2005/0135673 A1* | 6/2005 | Mantell | 382/162 |
| 2007/0002381 A1 | 1/2007 | Metcalfe et al. | |
| 2007/0081738 A1 | 4/2007 | Mantell | |

OTHER PUBLICATIONS

R. Levien, "Output Dependent Feedback in Error Diffusion Halftoning," IS&T $46^{th}$ Annual Conference, Cambridge, Mass. (May 1993).
G. Marcu, "Error Diffusion Algorithm with Output Position Constraints for Homogeneous Highlight and Shadow Dot Distribution," Journal of Electronic Imaging, vol. 9(1), pp. 46-51 (Jan. 2000).
K. Kang et al., "A Channel Dependent Color Error Diffusion Method Based on the Distance Constraint," Proc. of SPIE-IS&T Electronic Imaging, SPIE vol. 5293, pp. 306-312, 2004.

* cited by examiner

Primary Examiner — Steven Kau
Assistant Examiner — Quang N Vo
(74) Attorney, Agent, or Firm — Oliff & Berridge, PLC

(57) ABSTRACT

A method and system for processing image data in an image processing device for a plurality of pixel positions within a plurality of scanlines. The method and system includes storing a starting stamp value and a plurality of delta stamp values for the scanline. The stored values being used to generate a pixel stamp value for an input pixel in the scanline, by adding a starting value or previous pixel stamp value and the stored delta stamp value for the input pixel. Further includes receiving an input pixel intensity value for the input pixel and determining an output pixel intensity value. Subsequently, if the output pixel intensity value for the input pixel is equal to a value for a dot or hole the delta stamp values for at least one pixel having a location previous or subsequent to the input pixel can be updated.

23 Claims, 8 Drawing Sheets

| x\y | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
|  | 23 | 24 | 25 | 26 | 27 | 28 | 29 | 30 | 31 | 30 | 29 | 28 | 27 | 26 | 25 | 24 | 23 | 22 | 21 | 20 | 19 |
|  | 22 | 23 | 24 | 25 | 26 | 27 | 28 | 29 | 30 | 29 | 28 | 27 | 26 | 25 | 24 | 23 | 22 | 21 | 20 | 19 | 18 |
|  | 21 | 22 | 23 | 24 | 25 | 26 | 27 | 28 | 29 | 28 | 27 | 26 | 25 | 24 | 23 | 22 | 21 | 20 | 19 | 18 | 17 |
| 4 | 20 | 21 | 22 | 23 | 24 | 25 | 26 | 27 | 28 | 27 | 26 | 25 | 24 | 23 | 22 | 21 | 20 | 19 | 18 | 17 | 16 |
|  | 19 | 20 | 21 | 22 | 23 | 24 | 25 | 26 | 27 | 26 | 25 | 24 | 23 | 22 | 21 | 20 | 19 | 18 | 17 | 16 | 15 |
|  | 18 | 19 | 20 | 21 | 22 | 23 | 24 | 25 | 26 | 25 | 24 | 23 | 22 | 21 | 20 | 19 | 18 | 17 | 16 | 15 | 14 |
|  | 17 | 18 | 19 | 20 | 21 | 22 | 23 | 24 | 25 | 24 | 23 | 22 | 21 | 20 | 19 | 18 | 17 | 16 | 15 | 14 | 13 |
| 8 | 16 | 17 | 18 | 19 | 20 | 21 | 22 | 23 | 24 | 23 | 22 | 21 | 20 | 19 | 18 | 17 | 16 | 15 | 14 | 13 | 12 |
|  | 15 | 16 | 17 | 18 | 19 | 20 | 21 | 22 | 23 | 22 | 21 | 20 | 19 | 18 | 17 | 16 | 15 | 14 | 13 | 12 | 11 |
|  | 14 | 15 | 16 | 17 | 18 | 19 | 20 | 21 | 22 | 21 | 20 | 19 | 18 | 17 | 16 | 15 | 14 | 13 | 12 | 11 | 10 |
|  | 13 | 14 | 15 | 16 | 17 | 18 | 19 | 20 | 21 | 20 | 19 | 18 | 17 | 16 | 15 | 14 | 13 | 12 | 11 | 10 | 9 |
| 12 | 12 | 13 | 14 | 15 | 16 | 17 | 18 | 19 | 20 | 20 | 21 | 22 | 23 | 24 | 25 | 26 | 27 | 28 | 29 | 30 | 31 |
|  | 11 | 12 | 13 | 14 | 15 | 16 | 17 | 18 | 19 | 19 | 20 | 21 | 22 | 23 | 24 | 25 | 26 | 27 | 28 | 29 | 30 |
|  | 10 | 11 | 12 | 13 | 14 | 15 | 16 | 17 | 18 | 18 | 19 | 20 | 21 | 22 | 23 | 24 | 25 | 26 | 27 | 28 | 29 |
|  | 9 | 10 | 11 | 12 | 13 | 14 | 15 | 16 | 17 | 17 | 18 | 19 | 20 | 21 | 22 | 23 | 24 | 25 | 26 | 27 | 28 |
| 16 | 8 | 9 | 10 | 11 | 12 | 13 | 14 | 15 | 16 | 16 | 17 | 18 | 19 | 20 | 21 | 22 | 23 | 24 | 25 | 26 | 27 |
|  | 7 | 8 | 9 | 10 | 11 | 12 | 13 | 14 | 15 | 15 | 16 | 17 | 18 | 19 | 20 | 21 | 22 | 23 | 24 | 25 | 26 |
|  | 17 | 18 | 19 | 20 | 21 | 22 | 23 | 24 | 25 | 26 | 27 | 28 | 29 | 30 | 31 | 30 | 29 | 28 | 27 | 26 | 25 |
|  | 16 | 17 | 18 | 19 | 20 | 21 | 22 | 23 | 24 | 25 | 26 | 27 | 28 | 29 | 30 | 29 | 28 | 27 | 26 | 25 | 24 |
| 20 | 15 | 16 | 17 | 18 | 19 | 20 | 21 | 22 | 23 | 24 | 25 | 26 | 27 | 28 | 29 | 28 | 27 | 26 | 25 | 24 | 23 |
|  | 14 | 15 | 16 | 17 | 18 | 19 | 20 | 21 | 22 | 23 | 24 | 25 | 26 | 27 | 28 | 27 | 26 | 25 | 24 | 23 | 22 |
|  | 13 | 14 | 15 | 16 | 17 | 18 | 19 | 20 | 21 | 22 | 23 | 24 | 25 | 26 | 27 | 26 | 25 | 24 | 23 | 22 | 21 |
|  | 12 | 13 | 14 | 15 | 16 | 17 | 18 | 19 | 20 | 21 | 22 | 23 | 24 | 25 | 26 | 25 | 24 | 23 | 22 | 21 | 20 |
| 24 | 11 | 12 | 13 | 14 | 15 | 16 | 17 | 18 | 19 | 20 | 21 | 22 | 23 | 24 | 25 | 24 | 23 | 22 | 21 | 20 | 19 |
|  | 10 | 11 | 12 | 13 | 14 | 15 | 16 | 17 | 18 | 19 | 20 | 21 | 22 | 23 | 24 | 23 | 22 | 21 | 20 | 19 | 18 |
|  | 9 | 10 | 11 | 12 | 13 | 14 | 15 | 16 | 17 | 18 | 19 | 20 | 21 | 22 | 23 | 22 | 21 | 20 | 19 | 18 | 17 |
|  | 8 | 9 | 10 | 11 | 12 | 13 | 14 | 15 | 16 | 17 | 18 | 19 | 20 | 21 | 22 | 21 | 20 | 19 | 18 | 17 | 16 |
| 28 | 7 | 8 | 9 | 10 | 11 | 12 | 13 | 14 | 15 | 16 | 17 | 18 | 19 | 20 | 21 | 20 | 19 | 18 | 17 | 16 | 15 |

*FIG. 3*
(RELATED ART)

STORAGE OF STAMP INFORMATION FOR ERROR DIFFUSION

BACKGROUND

The disclosed embodiments generally relate to the field of image processing involving error diffusion.

Error diffusion methods, such as the method described in R. W. Floyd & L. Steinberg, "An Adaptive Algorithm for Spatial Grayscale," in the Proceedings of the Society for Information Display, vol. 17, pp. 75-77 (1976) (the "Floyd-Steinberg method"), are often used to convert grayscale images to binary images on a binary output device. Such error diffusion methods typically examine a pixel in an input image, determine whether the intensity for the pixel in the input image exceeds a threshold, and assign either a light or dark binary value to the pixel in an output image based on whether the intensity exceeds the threshold. The difference between the input image pixel intensity and the corresponding pixel intensity in the output image is the error for the pixel. Error diffusion methods assign at least a portion of the error to one or more neighboring pixels. In this manner, the total pixel intensity is substantially maintained throughout the output image without a substantial loss of resolution. However, individual pixels might be lighter or darker in the resulting output image than in the input image.

FIG. 1 depicts a traditional one-dimensional error diffusion method, for an 8-bit color, and the resulting light/dark values for four exemplary pixels. It is generally known that each pixel can have a grayscale value within a specified range that can be based on the number of bits associated with the color. Therefore, in an exemplary embodiment including an 8-bit color, a low value for the grayscale range is "0" and a high value for the range is "255". In FIG. 1 the threshold for the light/dark determination is the midpoint of the range (i.e., a grayscale value of 127.5). Since the first pixel has a grayscale value greater than the threshold, the pixel is assigned a value of "1" (e.g., "dark" or "black"). The difference between the original grayscale value for the first pixel and the resulting high value is defined by the error value, E. In other words, the error is equal to the amount of compensation added to a pixel in order to force it to a "0" or "1" value.

In regard to the second pixel shown in FIG. 1, the error value $E_1$ is subtracted from the original value for the pixel. Since the resulting value is less than the threshold, the second pixel is assigned a value of "0" (e.g., "light" or "white"). The error value $E_2$ is then calculated for the second pixel and the error value $E_2$ is subtracted from the original value for the third pixel. In this traditional one-dimensional error diffusion method the error iterates over each of the subsequent pixels until all the pixels are calculated. Alternate error diffusion methods may diffuse the calculated error among a plurality of unconverted pixels. For example, a first portion of the error value $E_1$ for the first pixel could be subtracted from the second pixel and a second portion of the error value $E_1$ could be subtracted from the third pixel.

Exemplary methods for using error diffusion to generate an output image include the methods described in U.S. Pat. Nos. 5,226,094 and 5,374,997 (Eschbach). These disclosures are incorporated herein by reference in their entireties.

One problem inherent in the Floyd-Steinberg method is that blemishes, for example, displeasing textures like worms can be produced in the highlight and shadow regions of the output image. An exemplary error diffusion method for minimizing blemishes is referred to as "threshold stamping", described in U.S. Pat. No. 5,535,019 (Eschbach) and U.S. Patent Publication No. 2007/0081738 (Mantell), which are incorporated herein by reference in their entireties. Threshold stamping modulates the error diffusion threshold level in order to adjust the dot placement in the extreme highlight and shadow regions to help diminish these worm type defects. The stamping function uses a line-buffer of memory to store and adjust a threshold value that is used in relation to downstream pixels via error diffusion processing.

Although threshold stamping improves image quality by improving the location of the dots within light regions and holes within dark regions, as described by Eschbach it is relatively computationally expensive and memory intensive. For example, a threshold stamping could require that a damping function be used to decay a stamped threshold modification value. This damping function could require multiplying the threshold delta value for each pixel by a constant. This type of multiplication is computationally expensive. The damping function can further require that the stamped threshold modification values start with a large value to ensure that the stamping effect persists over a sufficient number of lines of pixels. In addition, it could be necessary for overlapping stamped pixel threshold modifications to be summed, which provides an additional calculation operation for each step.

FIG. 2 depicts a block diagram of an exemplary threshold scanline buffer memory, described in U.S. Publication No. 2007/0002381, which is incorporated herein by reference in its entirety. This embodiment is designed to reduce the amount of memory necessary to perform threshold stamping, but can still be relatively computationally expensive. However, it can enable memory savings by storing a downscaled stamped threshold modification value. As shown in FIG. 2, the threshold stamping function is performed using a register array 110. Some stamped threshold modification values for a scanline are stored within the threshold scanline buffer memory 120 at any given time. During pixel processing, stamped threshold modification values are retrieved from the threshold scanline buffer memory 120 and are stored within a series of register blocks in the register array 110.

The register array 110 forms a "rolling-buffer" architecture in which information from a previous scanline is retrieved from the error scanline buffer memory 130 and the threshold scanline buffer memory 120. The information is then modified by an error diffusion algorithm and a threshold stamping algorithm is applied within the register array 110 and the stamped threshold modification value is decayed via the threshold damping circuit 140. This information is then stored again within the same memory locations in the scanline buffer memory 120. Consequently, the threshold and error data are updated by the above identified processing for subsequent pixels and scanlines.

The following pertains to a related embodiment involving an error diffusion algorithm and a threshold stamping algorithm. FF[+12], as shown in the register array 110 of FIG. 2, can receive a pixel intensity value 150, which can be a value within a range from, for example, 0 to 255; an error value from the error scanline buffer memory 130, which can be a value within a range from, for example, −128 to 127; and a threshold value from the threshold scanline buffer memory 120, which can be a value within a range from, for example, 0 to 255 or a threshold modification value which can be a value within the range from, for example, −128 to 127. The sample ranges are based on an 8 bit color. The pixel intensity value 150 represents the pixel intensity of a corresponding pixel in an input image. The error value represents the initial error assigned to the pixel according to an error diffusion algorithm. The threshold value represents a stored threshold value for the pixel based on preceding scanlines and FF[0] (i.e., the error diffusion block 160) performs error diffusion for a particular pixel.

The size of the threshold scanline buffer memory 120 can be significantly reduced by performing interpolation and extrapolation of the threshold values using threshold upscaling logic 170 and threshold downscaling logic 180, as shown in FIG. 2. For example, the threshold value may be received from the threshold upscaling logic 170, which may interpolate intermediate threshold values for intervening pixels between threshold values stored in the threshold scanline buffer memory 120 for particular pixels. Likewise, updated threshold values can be averaged and sampled using threshold downscaling logic 180. The downscaled threshold value can be passed to the threshold damping circuit 140. The threshold damping circuit 140 can multiply the updated stamped threshold modification value by a value, such as a value between about 0 and about 1. The damped stamped threshold modification value can reduce the effect of the threshold delta value on a particular pixel position for each subsequent scanline. Alternately, the threshold downscaling logic 180 and the threshold damping circuit 140 are combined into one circuit to reduce delay in calculating the damped threshold value.

In order to reduce the amount of memory necessary to implement this type of error diffusion, the threshold modification value and the error value can be stored in the same memory location within the threshold scanline buffer memory 120 and the error scanline buffer memory 130, respectively, from which they were originally retrieved. The values can then be used, for example, in the computation of the threshold and error values for the next scanline.

However stamped threshold modification values can still result in large values that need to be stored even when using a register array. Furthermore, in a typical stamp function algorithm, a stamped threshold modification value may be assigned to each location, for example, for each pixel, in an array and the these values can typically have large values (such as 8 bits per pixel). Therefore, the amount of memory required to store just those values for an entire scanline is large. As such, the memory required to implement stamping functions can be greater than desired for particular implementations, even while using the above discussed memory and computation saving measures.

One approach to dealing with the cost and efficiency concerns surrounding the amount of memory required to implement stamp functioning type error diffusion, involves systematically reducing the values that need to be stored. One exemplary embodiment is a method referred to as countdown stamp error diffusion. Exemplary embodiments of methods and systems for performing threshold stamping used in countdown stamp error diffusion is described in U.S. Patent Publication No. 2007/0081738 (Mantell). This disclosure is incorporated herein by reference in its entirety. Another approach to dealing with concerns regarding cost and efficiency is the stamp field implementation, which is described in U.S. Pat. No. 7,317,556. This disclosure is also incorporated herein by reference in its entirety.

In embodiments of countdown stamp functioning or stamp field implementations, a stored stamp value can correspond to each pixel. The stored stamp value can be a value requiring a smaller number of bits than the actual threshold value or threshold modification value of conventional stamping function implementations. For example a stored stamp value may range from 0 to 31. In this manner, less storage space is required to store pixel values for each pixel. An exemplary embodiment of this type of stamp functioning algorithm is shown in FIG. 3. In FIG. 3, the maximum stored stamp value is "31" and the stored stamp values linearly decrease away from stamped pixels within the same scanline (e.g., locations having the same "y" value) and subsequent scanlines.

As discussed above, when a threshold delta value is determined using the countdown stamp function, the values may not be as large as those used with typical stamp functions because the values do not have to persist for many scanlines through a multiplicative decaying function. One exemplary embodiment may include setting the threshold delta value to a small constant value, such as either +16 or −16 for pixels requiring a threshold value with light or dark input values, respectively, This algorithm can work in a manner similar for input pixel intensity values near "0" and near "255" with the exception that the sign of the delta threshold is reversed. However, this method also requires more memory than may be desired.

Further to this embodiment, a maximum stored stamp value may be, for example, "31," shown in related art FIG. 3. In such an embodiment, if the input pixel intensity value equals "1," a pixel with a stored stamp value above "10" may receive a modification to the threshold of +16. If an input pixel intensity value equals "2," a pixel with stored stamp value above "18" may receive the modified threshold. If an input pixel intensity value equals "3," a pixel with a stored stamp value above "20" may receive the delta threshold. In other words, as the pixel intensity value for a particular pixel increases, the stored stamp value required may increase as well until, for some input pixel intensity value below "128," the mid-point of the input pixel intensity values, no threshold modification value may be added.

Furthermore, the threshold modification values may smoothly approach zero. The threshold modification values may decrease for input pixel intensity values further from zero. For example, the threshold modification values for input pixel intensity values of 20 and below may be 16 and then may be reduced by 1 for each subsequent input pixel intensity value. In other words, for an input pixel intensity value of 36 or higher, the threshold modification value may be equal to zero.

What is needed is an error diffusion stamp function storage method and system that efficiency stores stamp values. For example, for a pixel having an input pixel intensity value of "1" the threshold modification value may be set to "16" at stored stamp values of 16 or greater and may be set to the stored stamp value for values below 16. In a similar embodiment, a comparable threshold modification level may be set for pixels exceeding a particular breakpoint.

A further need exists for a method of further reducing the amount of memory necessary for implementing an error diffusion algorithm while substantially maintaining image quality.

SUMMARY

Implementation of stamp functioning can reduce or minimize the occurrence of worms and/or worm holes, but may require relatively complex and/or computationally intensive calculations. Moreover, implementation of a stamping function in terms of hardware may be relatively computationally intensive, memory intensive, and/or logic gate intensive.

Various algorithms have been developed to reduce the amount of memory necessary to implement error diffusion in an image processing device.

In an exemplary embodiment of performing threshold stamping using countdown or stamp field functioning, the difference in pixel stamp values from one pixel to a neighboring pixel can be only +1, 0, or −1. Therefore, the memory required to implement stamp functioning can be further reduced by storing only the difference in pixel stamp value between neighboring pixels, rather than storing the actual incremented or decremented pixel or stamp value. This embodiment can be configured such that only 2 bits of memory are needed per pixel, per color to store a value related to the pixel. This exemplary embodiment can be further combined with the use of sub sampling and/or extrapolation, wherein the difference in pixel stamp value between neighboring pixels is only stored for some pixels and the pixel stamp values are interpolated for the pixels in between. In this embodiment, fewer values of larger increments can be stored with an overall net reduction in the amount of memory required to store the pixel stamp values. For example, storing every third value would require 3 bits for each stored pixel stamp value to accommodate 7 possible increments of +3 to −3. Intermittent values can be extrapolated by comparing stored changes in pixel values in addition to changes in pixel stamp values for neighboring pixels.

In an exemplary embodiment, in order to change pixel stamp values for subsequent scanlines, only the starting stored pixel stamp value can be required to be changed. All subsequent stamp values can be determined in turn using the stored stamp value differences. However, in some circumstances the pixel stamp value can be a negative number, in one embodiment a decrement can be passed off to subsequent pixels until a non-negative pixel stamp value is reached.

BRIEF DESCRIPTION OF THE DRAWINGS

FIG. 3 is an exemplary method of a pixel value array.

EMBODIMENTS

Figure 1:
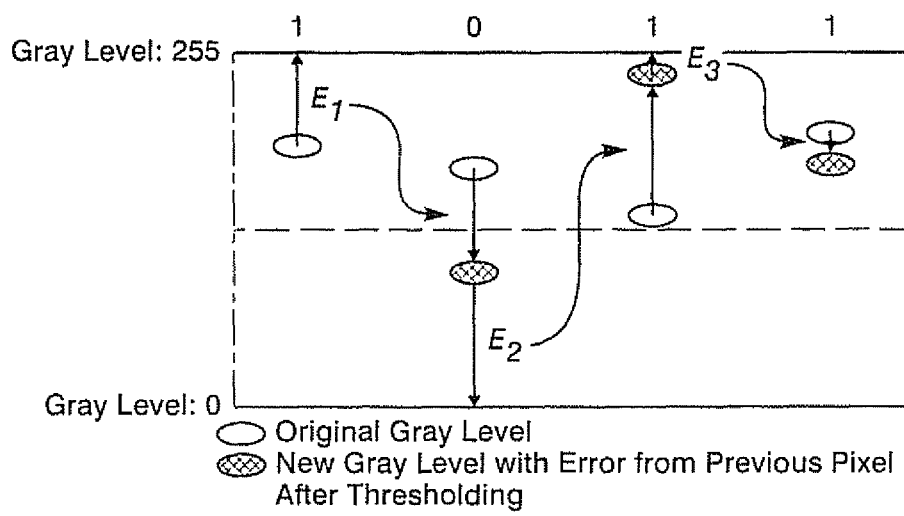
FIG. 1 is an exemplary method of error diffusion.
Figure 2:
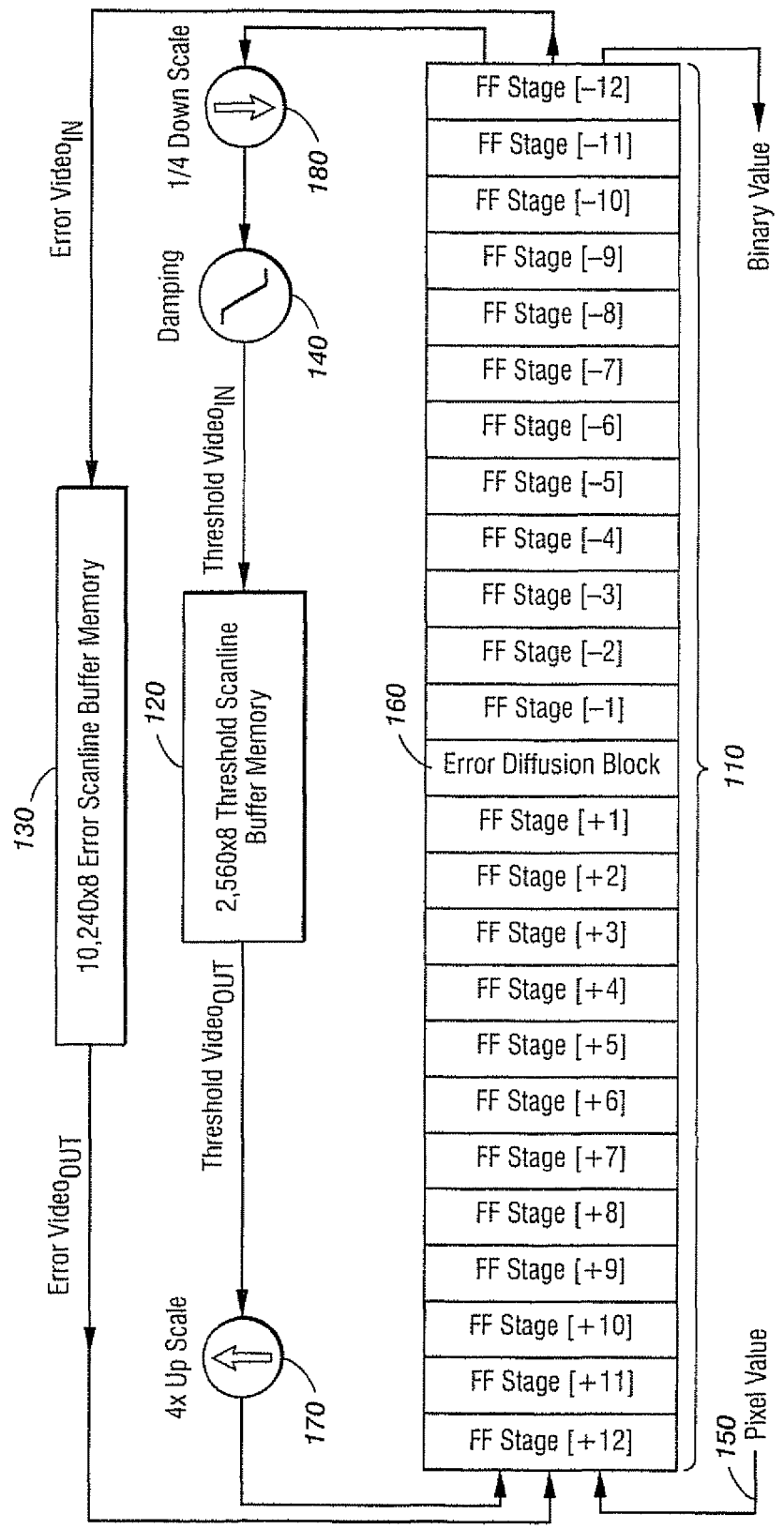
FIG. 2 is an exemplary method of stamp functioning.

This disclosure is not limited to the particular methodologies, systems, apparatuses and materials described, as these may vary. Furthermore, the terminology used in the description is for the purpose of describing the particular versions or embodiments only, and is not intended to limit the scope of the disclosure.

It must also be noted that as used herein and in the claims, the singular forms "a," "an," and "the" include plural references unless the context clearly dictates otherwise. Thus, for example, reference to a "pixel" is a reference to one or more pixels and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

A "dot" may be a dark output pixel. A "hole" may be a light output pixel. For purposes of the discussion contained herein, reference will be made to placing dots. However, the discussion herein equivalently also applies to placing holes.

A "stored pixel stamp value," "stored pixel value," "stored stamp value," "stored starting value" and "stored delta stamp value" may refer to a value that is stored in and retrieved from a memory, such as a scanline buffer memory, for a pixel. The stored pixel stamp value, stored pixel value and stored delta stamp value may be updated based on stamping and decaying functions. If sub-sampling and/or extrapolation are used, intermediate pixel values may be extrapolated from two or more stored pixel stamp values, two or more stored pixel values or two or more stored delta stamp values. As used herein, the terms "stored pixel stamp value," "stored pixel values," and "stored stamp value" includes intermediate pixel values and "stored delta stamp value" includes intermediate stored differences in pixel values.

A "pixel intensity value" may refer to a value representing the lightness and darkness of a pixel in an image. An error diffusion process may be used to increase or decrease an input pixel intensity value for a particular pixel based on a diffused error value. In a colored pixel embodiment, a plurality of pixel intensity values may be used, where each pixel intensity value represents the lightness or darkness of a particular color for the pixel to which the pixel intensity value pertains. Each pixel intensity value may be modified by a diffused error value corresponding to the same color.

Countdown stamp functioning, which can reduce the complexity of implementing error diffusion, has been described in U.S. Patent Publication No. 2007/0081738 (Mantell).

The stamp field method, which can reduce the complexity of implementing stamp functions for error diffusion, has been described in U.S. Pat. No. 7,317,556 (Mantell), and U.S. Patent Publication No. 2005/0135673 (Mantell), each of which is incorporated herein by reference in its entirety. A stamp field may permit the distance to previously printed dots to be determined without further calculation and without searching nearby pixels. Methods that require searching previously printed pixels are disclosed in R. Levien, "Output Dependent Feedback in Error Diffusion Halftoning," IS&T 46th Annual Conference, Cambridge, Mass. (May 1993); G. Marcu, "Error diffusion algorithm with output position constraints for homogeneous highlight and shadow dot distribution," Journal of Electronic Imaging, vol. 9(1), pp. 46-51 (January, 2000); U.S. Pat. No. 5,917,614 (Levien); Proc. Of SPIE-IS&T Electronic Imaging, SPIE Vol 5293, pp. 306-312, 2004 (Kang); and U.S. Pat. No. 6,160,921 (Marcu), each of which is incorporated herein by reference in its entirety. A distance metric method may measure the distance between a particular pixel and the closest dot in the same or a previous scanline as the particular pixel. The distance may be measured, for example, using a "Euclidian" measure. A Euclidian distance between two points $(x_1, y_1)$ and $(x_2, y_2)$ equals $\sqrt{(x_1-x_2)^2+(y_1-y_2)^2}$. The distance may be determined, for example, using a "city-block" measure. A city-block distance between two points $(x_1, y_1)$ and $(x_2, y_2)$ may equal $|x_1-x_1|+a|y_1-y_2|$. The parameter a is a scale factor based on the ratio of size of blocks in the x and y directions. If the size of the blocks are then same in both directions then a equals one. Methods based on a city-block distance may be computationally simpler than other distance metrics. One significant simplification of such methods is that the stamp fields or countdown stamp contains enough information to determine the distance to the closest previously printed pixel without actually storing specific position information. Thus they do not require knowledge of the positions of previously printed points as Euclidian based techniques do.

A "pixel stamp value" or a "stamp value" can relate generally to an error diffusion method. A "stamp value" can relate specifically to the countdown or stamp field method of stamp functioning. For purposes of discussion contained herein, reference will be made to changing pixel stamp values and storing a difference in pixel stamp values between subsequent pixels. Wherein pixel stamp values can start at a large number and count down to a smaller number or the values can start at a small number and count up to a larger number.

Figure 4:
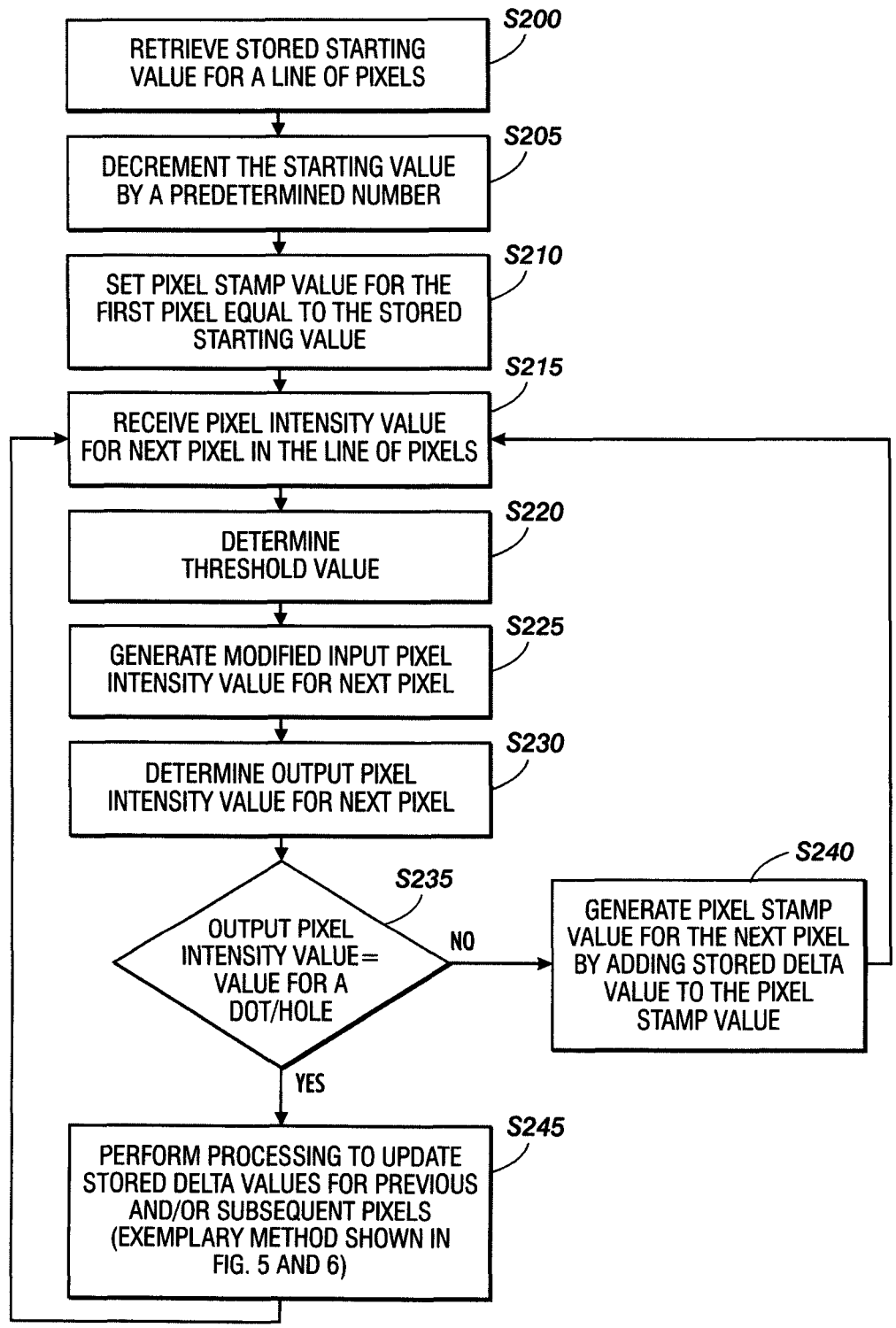
FIG. 4 is an exemplary method of countdown stamp functioning.
Figure 5:
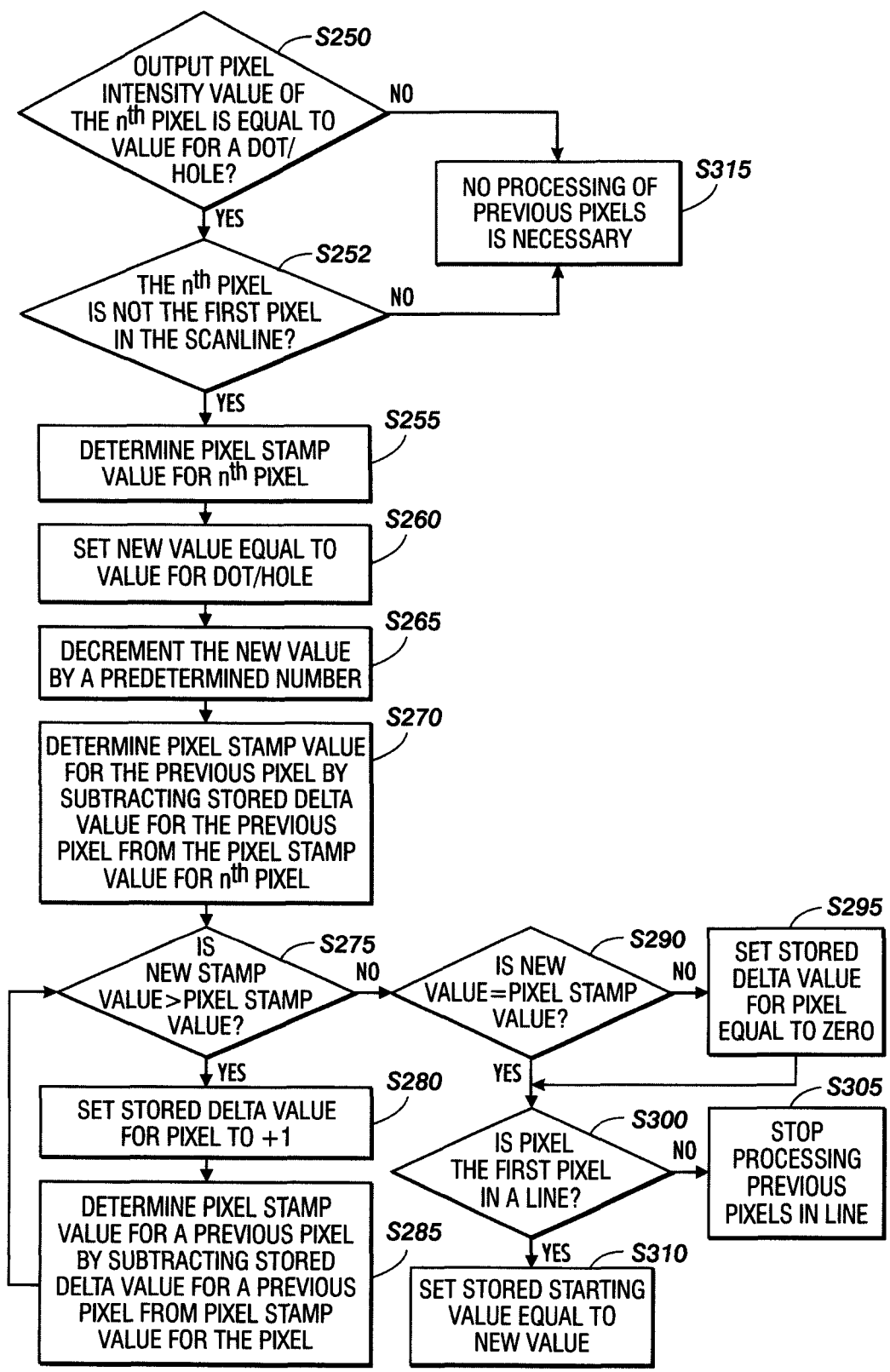
FIG. 5 is an exemplary method of countdown stamp functioning.
Figure 6:
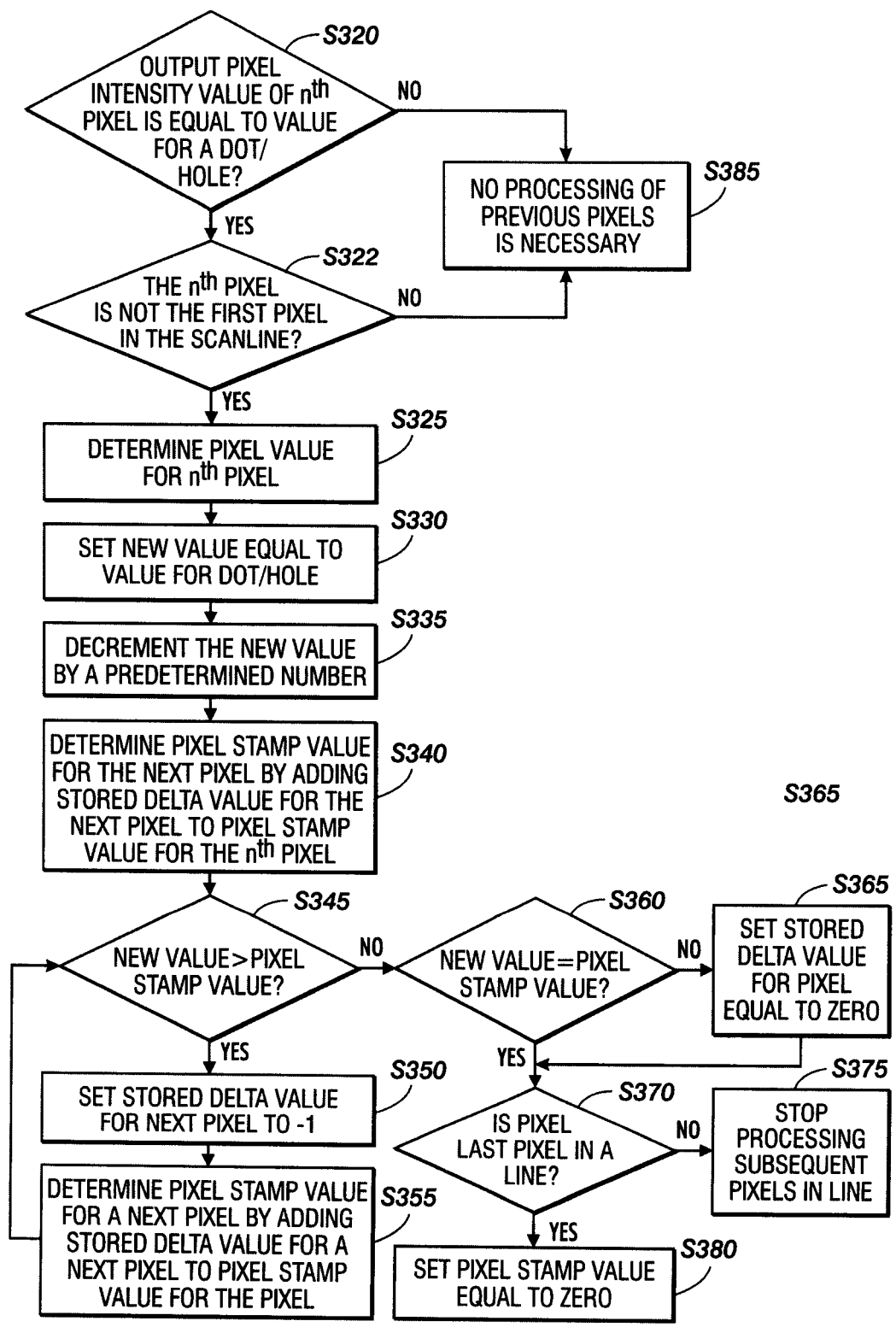
FIG. 6 is an exemplary method of countdown stamp functioning

In an exemplary embodiment of a stamp functioning process, as shown in FIGS. 4-6, a starting value for a line of pixels and an array of delta stamp values are stored in a memory location. For example, the delta stamp values can be stored in a scanline buffer memory. The stored delta stamp values can be used to reconstruct a pixel stamp value for each pixel in the scanline. For example, the stored starting value can be set to equal the pixel stamp value for the first input pixel in the scanline. In one exemplary embodiment, stored delta stamp values can then be added to or subtracted from the starting value to reconstruct pixel stamp values for subsequent pixel. In another exemplary embodiment, the stored delta stamp values represent a difference in pixel stamp values between two adjacent input pixels. Therefore, all preceding stored delta stamp values for previous pixels in the scanline can be used to reconstruct pixel stamp values. For example, to reconstruct the pixel stamp value for the $4^{th}$ pixel in the scanline, the stored delta stamp values for the $1^{st}$, $2^{nd}$ and $3^{rd}$ pixels can be added to the stored starting value for the scanline.

FIG. 4 illustrates an exemplary process by which stamp functioning is performed such that if the output pixel intensity value for a $n^{th}$ pixel is equal to the value for a dot in a highlight region or hole in a shadow region, then the stored delta stamp values for subsequent and/or previous pixels are updated. Note, FIG. 4 does not relate to the circumstance when the first pixel is equal to the value for a dot or hole. It may be necessary to separately consider whether the first pixel is a dot or hole. If the output pixel intensity value is not equal to the value for a dot or hole, then the pixel stamp value for the $n+1^{th}$ pixel can be determined by adding the stored delta stamp value for the $n^{th}$ pixel.

FIG. 5 illustrates an exemplary process by which previous pixels in a line of pixels are processed (wherein, the $n^{th}$ pixel is not the first pixel in the scanline) following the determination that the output pixel intensity value for the $n^{th}$ pixel is equal to the value for a dot in a highlight region or hole in a shadow region. Note, when it is determined that the output pixel intensity value for the first pixel is equal to the value for a dot or hole then are no previous pixels in the scanline to process. FIG. 6 illustrates an exemplary process by which subsequent pixels in a line of pixels are processed following the determination that the output pixel intensity value for the $n^{th}$ pixel is equal to the value for a dot or hole.

The various embodiments of a countdown stamp functioning processes and stamp field method stamp functioning can be replicated or adapted for pixel intensity values, pixel stamp values, and/or stamp values of more than one color. For example, in a countdown stamp functioning system that uses cyan, yellow, magenta and black, four pixel intensity values and/or pixel stamp values may be received for a first pixel, wherein each pixel intensity value corresponds to each of the colors. In this type of embodiment, the stamp functioning process can be replicated for each pixel intensity value and/or pixel stamp values. Another exemplary embodiment can use vector algorithms so that more than one color may be considered at a time. In this type of embodiment, the pixel stamp values and/or pixel intensity values for colors evaluated together may include contributions from all the colors. In another exemplary embodiment, the values can equal the sum, the minimum, or the maximum of each color that is processed concurrently, in another exemplary embodiment the values can equal a combined weighted sum based on each color.

The stamp functioning process can be started by retrieving a stored starting value for the scanline of pixels that needs to be processed, as shown in step S200. At the beginning of the line of pixels, the stored starting value can be changed by a predetermined number, as shown in step S205. Typically this number may be 1, but in order to accommodate images in which the slow and fast scan directions are different this number may be approximate to the ratio of the fast to the slow scan resolution. Pursuant to this process, the pixel stamp value for the first pixel may be set to equal to the updated starting value, as shown in step S210. Pursuant to this type of error diffusion process, it may also be necessary to receive a pixel intensity value for the $n^{th}$ pixel in the line of pixels, which can be defined as the pixel being processed pursuant to the exemplary process of stamp functioning. The pixel stamp value for the $n^{th}$ pixel is equal to the pixel stamp value of the nth−1 value plus the delta stamp value for the nth−1 pixel.

As shown in step S215, after the pixel stamp value for the first pixel is set equal to the updated starting value, the pixel intensity value for the next pixel that is to be processed in the scanline is received. The first time this will be the pixel intensity value for the first pixel. Using the input pixel intensity value for the next pixel, the first delta stamp value, and the pixel stamp value for the first pixel, it is possible to determine the delta threshold for the next pixel, as shown in step S220. The pixel intensity value for the next pixel may be further modified by adding one or more error values from previously processed pixels. As such this step can include determining a modified input pixel intensity value based on information related to a sequence of error values for pixels other than the pixel for which a pixel intensity value was received, as shown in step S225. This modification may be performed using an error diffusion algorithm. Therefore, this step generates a modified pixel intensity value related to the pixel for which a pixel intensity value was received.

In a typical stamp function algorithm, a threshold delta value can be assigned to each location, such as a pixel, in an array of pixels. The threshold delta value can represent an incremental value used to suppress or encourage dot placement and the values can also smoothly approach zero. Moreover, the threshold delta values can decrease for input pixel intensity values further from zero. For example, the threshold delta values for input pixel intensity values of 20 and below may be 16 and then may be reduced by 1 for each subsequent larger input pixel intensity value.

In an exemplary embodiment of the step of determining a threshold delta value, a lookup table ("LUT") may be accessed. The LUT table may contain one or more threshold delta values for a plurality of pixels. Accordingly, an exemplary embodiment that includes use of the table can reduce the size of a scanline buffer memory that stores the pixel values. In another exemplary embodiment, a function can be used to determine a threshold delta value. This function can include a pixel stamp value and a pixel intensity value as an input.

After a threshold delta value has been determined, a threshold value can be determined, as in shown in step S240. A threshold value can be calculated by summing the threshold delta value and a base threshold value. The same pixel stamp value may be retained for the pixel. On the other hand, the pixel stamp value may be reassigned if the intensity is lower than a specified value (e.g. below 32 and when a dot is printed) or greater than a specified value (e.g. above 255-32 when a hole is printed). For values above say 32 and below 255-32 the pixel stamp value can be retained regardless of whether a dot is printed at the pixel. Pixel values for other pixels within the same scanline (for example, pixels having the same 'y' value) can also be retained or updated, as discussed below.

After a modified pixel intensity value has been calculated for the next pixel, as shown in step S225 in FIG. 4, an output pixel intensity value for the pixel can be generated, as shown in step S230. At this point, the determined output pixel intensity value for the pixel is compared to the value for dot or hole. If the output pixel intensity value for the pixel is equal to a value for a dot in a highlight or hole in a shadow then it is necessary to process previous and/or subsequent pixels and to update the array of stored delta stamp values for the pixels that are processed to take into account the appearance of a dot or hole at the pixel, as shown in step S245. How this processing occurs is shown in greater detail in FIG. 5 and FIG. 6. If the output pixel intensity value is not equal to the value for a dot or hole, then a pixel stamp value for the pixel that is being processed (in FIG. 4 the pixel being processed is referred to as the "next pixel") can be generated by adding the stored delta stamp value for the pixel to the pixel stamp value for the previous pixel, as shown in step S240. After a pixel stamp value is generated for the pixel that was processed, then it may be necessary to process the "next pixel" in the scanline. As shown in FIG. 4, after step S240, this type of stamp functioning may return to step S215 to receive a pixel intensity value for the subsequent pixel in the scanline that needs to be processed.

As shown in FIG. 4, the process of checking whether the output pixel intensity value for the "next pixel" is equal to the value for a dot or hole may continue for the entire scanline. As shown in step S245, if the output pixel intensity value for the pixel that is being processed is equal to a dot in a highlight region or hole in a shadow region then processing is performed to update the stored delta stamp values for previous and subsequent pixels. After which, as discussed above, FIG. 4 only relates to the circumstance when the first pixel in the scanline does not have an output pixel intensity value that is equal to the value for a dot or hole. However, the same processing steps of determining the threshold value, generating a modified input pixel intensity value and determining an output pixel intensity value apply for the first pixel. Furthermore, pursuant to this type of stamp function, it is necessary to determine whether the first pixel is a dot or hole. If it is determined that a dot or hole is printed at the first pixel, then it may be necessary to process subsequent pixels in the scanline.

In an exemplary embodiment, when a dot or hole of a given color is printed, a fixed pixel value or stamp value can be assigned, for example 20. Then, for subsequent pixels the pixel stamp value is decremented by 1. Therefore, the pixel stamp value can be decremented by 1 for each pixel as one moves away from the printed dot on the current scanline and the pixel stamp value can also be decremented by 1 for each subsequent scanline as one moves to the next scanline. There are various embodiments on how to account for the decrements in pixel stamp value. In one embodiment, in the forward direction the decrement is taken into account as each pixel is visited. However, the reverse direction can be more complicated. In one embodiment, the decrement in pixel stamp value can either be taken into account at the time a dot is printed. In another embodiment, all the reverse decrements can be dealt with at one time after a scanline is finished processing. But, when storing delta stamp values the reverse decrements must be taken care of when the dot or hole is printed since that actual pixel stamp values are not retained.

In another embodiment of stamp functioning after a dot or hole of a given color is printed, the stored difference in pixel stamp value of the pixel where the dot or hole was placed and subsequent and previous pixels are updated to generate a new pixel stamp value for subsequent and previous pixels. The stored delta stamp value related to the pixel stamp value can then be updated. The change in pixel stamp value is by an amount that is a fixed number. In an exemplary embodiment, scanline buffer memory can store the change in difference in pixel or stamp value between neighboring pixels. Then the stamp functioning algorithm can process the pixel stamp value for previous pixels based on the stored difference in pixel stamp values and the base pixel stamp value. The stored values, which includes the starting value and the array of delta stamp values, can be used to calculate previous pixel stamp values. The pixel stamp values can be calculated backwards, while also calculating the new pixel stamp values as the stamp functioning algorithm proceeds backwards to account for the dot or hole that was placed at a subsequent pixel. For example, if the change in pixel stamp value is positive, such that the new pixel stamp value is larger than the replaced pixel stamp value, the stored change in pixel stamp value would be +1. After the new difference in pixel stamp value is stored, the stamp functioning algorithm can proceed to recalculate the change in values for earlier pixels in the scanline. In an alternative exemplary embodiment a buffer of stamp values around the current pixel can be retained. The buffer is filled on one end by reconstructing pixels using the last pixel stamp value and the delta value. On the other end the pixels are downscaled by calculating the delta stamp value and storing that delta stamp value in the array of such values. If this buffer is as large or larger than the range of possible pixel stamp values then updating due to a dot or hole will only update pixel stamp values within the buffer of stamp values, thus this embodiment may avoid the need to update delta stamp values.

FIG. 5 illustrates an exemplary stamp functioning process for processing previous pixels in relation to a dot or hole being placed at the $n^{th}$ pixel. As shown in step S250, this processing of previous pixels is only necessary if it is determined that the output pixel intensity value for the $n^{th}$ pixel is equal to a value for a dot in a highlight or hole in a shadow. As shown in step S252, it is also only necessary to proceed with processing of previous pixel is it is determined that the $n^{th}$ pixel is not the first pixel in the scanline. In order to process previous pixels, it is necessary to determine the pixel stamp value for the $n^{th}$ pixel, as shown in step S255. Wherein, a pixel value for the $n^{th}$ pixel is generated by adding the stored delta stamp value for the $n^{th}$ pixel to the pixel stamp value that was generated pursuant to the process described in FIG. 4. Furthermore, a new value is set equal to the value for a dot or hole, as shown in step S260. Pursuant to this exemplary stamp functioning process, the new value can also be decremented by a predetermined number, as shown in step S265. Then, it is necessary to determine a pixel value for the previous pixel by subtracting a stored delta stamp value for the previous pixel from the pixel stamp value for the $n^{th}$ pixel, as shown in step S270. The previous pixel is defined as a pixel that is located at a position in a scanline previous to the $n^{th}$ pixel that was found to have an output pixel intensity value that is equal to the value for a dot or hole. If the decremented new value is greater than the pixel stamp value for the previous pixel, as shown in step S275, then the stored delta stamp value for the previous pixel is set to +1, as shown in step S280. Subsequently, it is possible to continue processing previous pixels to account for the placement of a dot or hole at the $n^{th}$ pixel. To process other previous pixels, it may be necessary to determine the pixel stamp value for another previous pixel by subtracting the stored delta value for another previous pixel from the pixel stamp value for the pixel that was previously processed, as shown in step S285. At that point, the process can return to step S275 to compare the new value to the pixel stamp value that was generated for another previous pixel. In other words, after the $n^{th}-1$ pixel is processed, then the $n^{th}-2$ pixel can be processed using the same process that was used to process the $n^{th}-1$ pixel. Wherein, the pixel value of the $n^{th}-1$ pixel and the stored delta stamp value of the $n^{th}-2$ pixel can be used to reconstruct a pixel value for the $n^{th}-2$ pixel.

This type of processing, pursuant to the exemplary embodiment of stamp functioning that is discussed herein, continues until the new value is equal to or less than the pixel stamp value for the pixel that is being processed. As shown in FIG. 5, if the new value is equal to or less than the pixel stamp value for the "previous" pixel that is being processed, as shown in step S290, then processing of previous pixels stops. Specifically, if the new value is less than the "previous" pixel stamp value for the "previous" pixel then the stored delta stamp value for the pixel is set equal to zero, as shown in step S295. Therefore, for the situations where the new value is equal to or less than the pixel stamp value, it is necessary to determine whether or not the pixel being processed is the first pixel in a line of pixels, as shown in step S300. If the pixel being processed is not the first pixel, then the processing of previous pixels stops, as shown in step S305. If the pixel being processed is the first pixel, then the stored starting value is set equal to the new value, as shown in step S310.

As discussed above, FIG. 5 only relates to the circumstance where the $n^{th}$ pixel is not the first pixel in the scanline. Not shown in FIG. 4 is a step that checks whether the $n^{th}$ pixel is the first pixel in a scanline. If it is determined that the output pixel intensity value for the first pixel in a scanline is equal to the value for a dot or hole, then there is no processing of previous pixels in a scanline, as shown in FIG. 5. However, it may still be necessary to process subsequent pixels as shown in FIG. 6.

If the output pixel intensity value for the $n^{th}$ pixel is not equal to the value of a dot or hole, then it is not necessary to process previous pixels in accordance with the exemplary embodiment of the stamp functioning process, as shown in step S315.

FIG. 6 illustrates an exemplary stamp functioning process for processing subsequent pixels in relation to a dot or hole being placed at the $n^{th}$ pixel. As shown in step S320, processing of subsequent pixels is only necessary if it is determined that the output pixel intensity value of the $n^{th}$ pixel is equal to the value for a dot in a highlight or hole in a shadow. As shown in step S322, it is also only necessary to process subsequent pixels if it is determined that the $n^{th}$ pixel is not the last pixel in the scanline. In order to process subsequent pixels, it is necessary to determine the pixel value for the $n^{th}$ pixel, as shown in step S325. Furthermore, a new value is set to equal the value for a dot or hole, as shown in step S330. The new value can be decremented by a predetermined number, as shown in step S335. Next, a pixel value for the "next" pixel is determined by adding the stored delta stamp value for the "next" pixel to the pixel stamp value for the $n^{th}$ pixel, as shown in step S340.

As shown in step S345, if the new value is greater than the pixel stamp value for the "next" pixel then the stored delta stamp value for the $n^{th}+1$ pixel is set to −1, as shown in step S350. Subsequently, the process involves processing further subsequent pixels. As shown in step S355, the stamp functioning process involves the next step of processing another "next" pixel in the same manner as the previous pixel was processed. This processing step may involve determining the pixel stamp value for another "next" pixel by adding the stored delta stamp valve for another next pixel to the pixel stamp value for the pixel that was previously processed, as shown in step S355. At that point, the process can return to step S345 to compare the new value to the pixel stamp value that was generated for another next pixel.

However, as shown in step S360, if the new value is equal to or less than the pixel value for the next pixel, wherein the term "next pixel" is used to refer to the pixel that is currently being processed by the exemplary method of stamp functioning, then further processing of subsequent pixels is not necessary. Specifically, if the new value is less than the pixel stamp value of the next pixel then the stored delta stamp value for the pixel that is being processed is set equal to zero, as shown in step S365. It is also necessary to ask if the pixel being processed is the last pixel in the line, as shown in step S370. If the pixel being processed is not the last pixel in the scanline then further processing of subsequent pixels is not necessary and the processing is stopped, as shown in step S375. If the pixel being processed is the last pixel in the line then the pixel stamp value for the pixel is set equal to zero, as shown in step S380.

If the output pixel intensity value for the $n^{th}$ pixel is not equal to the value of a dot or hole, than it is not necessary to process subsequent pixels in accordance with the exemplary embodiment of the stamp functioning process, as shown in step S385. This whole process can be done after the dot or hole are printed or it can be done as each of the pixels is subsequently processed in turn.

In one embodiment of stamp functioning, no further decrements of pixel values are taken into account after the pixel stamp value reaches zero. Limiting the reach of pixel stamp values can serve one of many functions. For example, limiting the range of pixel stamp value decrements would normally serve to limit how much space is needed to store the pixel stamp values. This is not true when storing delta stamp values. The main function that stopping at zero serves, is that it can limit how far back the printing process has to change pixel stamp values when a new dot is printed.

How far back the stamp functioning algorithm recalculates pixel stamp values can depend on multiple factors including the following: pixel intensity values, threshold values and threshold delta values. For example, if the modified pixel intensity value does not exceed the threshold value, the pixel stamp value can be modified and a new delta stamp value can be stored in the scanline buffer memory. However in one embodiment, if the pixel stamp value is equal to zero, it is not further decremented.

As shown in FIG. 3, in one embodiment involving stamp functioning, assigned values typically linearly decrease or increase away from stamped pixels within the same scanline. Furthermore, pixel stamp values can also linearly decrease or increase for subsequent scanlines. In the latter case the limiting value is some larger value such as 20 and the stamp is not further incremented when that limiting value is reached.

As shown in FIG. 3, the pixel stamp values along a scanline and for subsequent scanlines can be shown in table form. The table illustrates a general pattern of pixel stamp values increasing or decreasing by a factor of 1. Therefore, as previously discussed, the difference in value among neighboring pixels is +1, 0 or −1. Each of the underlined values in the rows y=1, y=12 and y=18 show increasing pixel stamp values along the x direction. The values shown in FIG. 3 may represent stored pixel stamp values after processing each scanline since one or more of the values can be replaced during the processing of a scanline.

Figure 7:
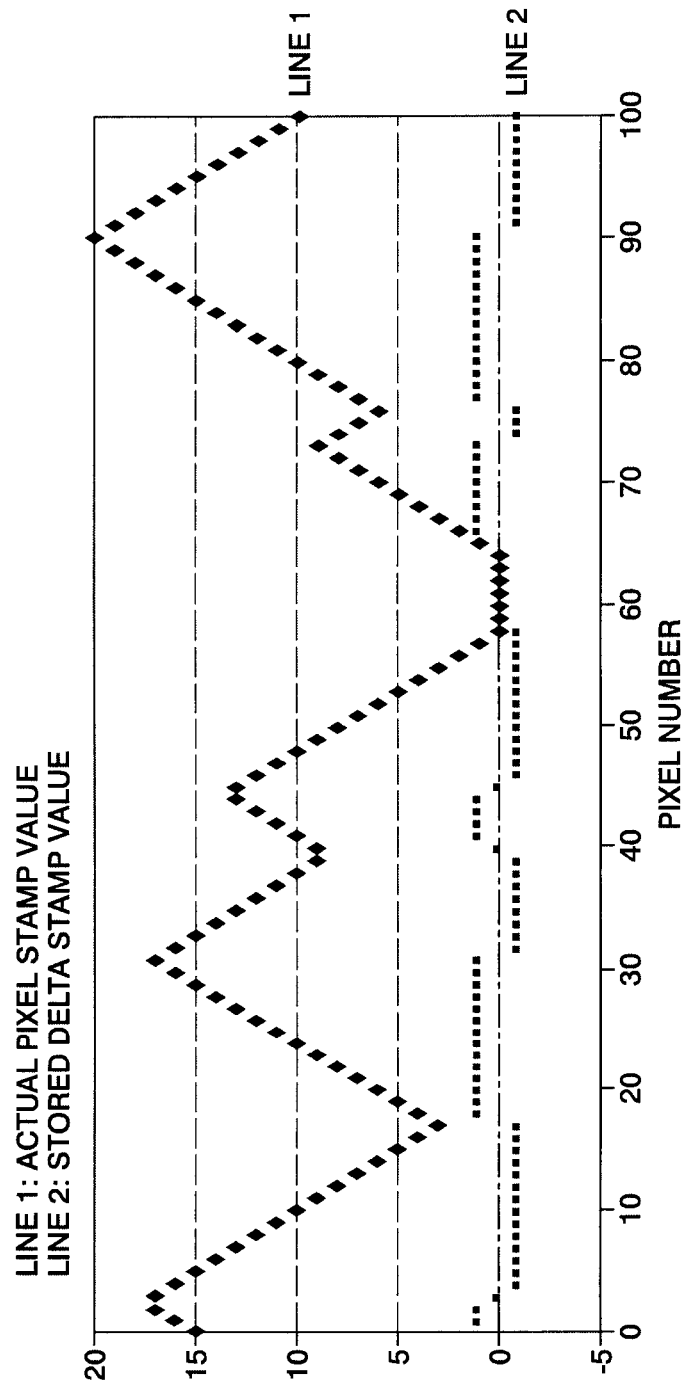
FIG. 7 is a schematic according to one embodiment.

In an embodiment discussed herein, the actual pixel stamp values are not stored in a memory, as shown at line 1 in FIG. 7. Rather the value representing the change in pixel stamp value between neighboring pixels is stored, as shown at line 7 in FIG. 7. This embodiment further reduces the amount of memory necessary to implement stamp functioning in a printing process. Specifically, this embodiment can reduce the number of bits required to store pixel stamp values because only the difference in pixel stamp value is actually stored in memory. To store a change of +1, or −1 only requires 2 bits. However, to store an actual pixel stamp value can require at least 4 bits. It should be understood that the 2 bits can be encoded in other ways. For example the values could represent +2, 0, or −2 if the block to represent a distance of 2 between pixels in a scanline. This may be useful for an asymmetric resolution where the city block distance between scanlines is different from the distance between pixels. In another exemplary embodiment 4 values can be assigned with 2 bits. For example, +1, 0, −1, and 0, where the first 0 represents the delta value of zero that occurs when the pixel stamp value is in the middle of the range of possible stamp values and the second zero is used when the pixel stamp value is at the limiting value of possible stamp values. This extra encoded zero can facilitate the process of limiting the stamp values to the desired range as discussed below.

In another embodiment, the stamp functioning algorithm may address situations where the pixel stamp value is negative. For example, in reference to FIG. 7, when the stamp functioning algorithm reaches pixel 58 the actual pixel stamp value could be a negative number. One exemplary embodiment of addressing this situation is to change the actual pixel stamp value at pixel 58 to zero. Furthermore, in order to preserve subsequent pixel stamp values the change in pixel stamp value at pixel 59 may be decremented by 1. In reference to FIG. 7, this process of moving the −1 difference in pixel value continues. Specifically, value corrections are made to each pixel until, for example, pixel 65 is reached. Assuming that at pixel 65 the pixel stamp value changes from −1 to 0, the pixel stamp values are again non-negative numbers. In an embodiment where pixel stamp values are non-negative numbers the difference in pixel stamp value may only be +1 or 0. Therefore, this type of stamp functioning process can prevent obtaining an increment value of +2.

The stamp functioning algorithm may address the issue of when a pixel stamp value for an input pixel is not within a predetermined set range. In an exemplary process, the delta stamp value for the input pixel, which has a pixel stamp value that is not within a predetermined range, is updated to a predetermined number. Thereafter, the difference between the predetermined number and the pixel stamp value for the input pixel is carried forward until the pixel stamp value for the input pixel is within the predetermined set range Another embodiment that can incorporate the embodiment discussed above, to further reduce the number of bits of memory necessary to implement stamp functioning, sub-sampling and/or extrapolation processes can be used. The sub-sampling and/or extrapolation processes can reduce the actual number of difference in pixel stamp values that are stored in a memory. One embodiment of sub-sampling and/or extrapolation process can include a first and second pixel stamp value or a first and second delta stamp value that are retrieved from the memory. One or more of the intermediate pixel stamp values can be calculated using sub-sampling logic or downscaling logic.

In one embodiment of sub-sampling logic, only 1 out of every $n^{th}$ delta stamp value is stored in a memory location. Wherein, n can be defined as any positive integer. To keep the number of bits require in the memory location to store a difference in pixel stamp value at a minimum, while maximizing the usefulness of the stamp functioning type error diffusion, x can be an integer between 1 and 7.

In another embodiment of sub-sampling logic, if the stored delta stamp values are n pixels apart, the incremental 2n+1 delta stamp values from −n to +n can be stored.

In an exemplary embodiment for efficient storage of difference in pixel stamp values or delta stamp values occurs for n=3. This embodiment requires 7 different values that can be stored using 3 bits of memory for every $n^{th}$ pixel. Sub-sampling can also further reduce the number of stored delta stamp values that must be changed after a drop or hole is printed. Other values of sub-sampling are possible and desirable. In another exemplary embodiment when n=2, 2 bits of memory may be used to store the delta stamp values. In this case with only 4 possible levels the stored delta values can be mapped to +2, +1, −1, and −2. In locations where the actual delta stamp value would preferably be 0 one can substitute another value that is compensated by previous or subsequent stored delta values. For example, if two delta values in a row would be zero then one may be set to +1 and the other to −1, thus giving approximately the more desired values. In some cases the differences in reconstructed stamp values can be corrected in an upscaling process, and even where they cannot, the savings in memory by using fewer bits to store delta stamps can outweigh the inaccuracy in reconstruction of the stamps.

In order to utilize a sub-sampling logic, it becomes necessary to extrapolate delta stamp values, and eventually actual pixel stamp values, for intermediate pixels. The extrapolation can be less complex when the change in pixel stamp value or delta stamp values between pixels over the range of n pixels is +n or −n. In such a situation it is obvious that the pixel stamp values have incremented or decremented, for a negative n value, by 1 over the range of n pixels. However, the sub-sampling logic can be more complex when the amount of increment between a range of n pixels is not one of the outer bounds. In this situation, there is clearly at least one pixel for which the value of the increment or delta stamp value is not the same.

In one embodiment of sub-sampling logic, in the situation where all the pixel stamp values in a range of n pixels did not all increase or decrease by a value of 1, there are some simplifying assumptions that can be used to determine the intermediate difference in pixel stamp values or delta stamp values. For example, the sub-sampling logic can make the assumption a peak would occur in the middle of the range of n pixels. If the preceding change in pixel stamp value or delta stamp value is positive and the subsequent change in pixel stamp value or delta stamp value is negative then it is reasonable to assume a peak in pixel stamp value occurs intermediate to the two sub-sampled pixels. Consequently, we can proceed from the most positive to the most negative increments in that order. Using, this process, intermediate differences in pixel stamp value or delta stamp values can be generated for use in error diffusion.

An exemplary embodiment of an assumption is described below. This example is for explanatory purposes and does not limit the specification to this single embodiment. If the sub-sampling is set to n=3, wherein every third difference in pixel stamp value or delta stamp value is stored, and for an exemplary pixel the increment is +2. Furthermore, the previous difference in pixel stamp value or delta stamp value is positive and the subsequent difference in pixel stamp value or delta stamp value is negative. Then, pursuant to the sub-sampling algorithm it can be assumed that the intermediate difference in pixel stamp values or delta stamp values are +1, +1, 0. Switching this order should not have a significant effect on the image quality.

In another exemplary embodiment, if the difference in pixel stamp value or delta stamp value is −2 between pixels in a n=3 sub-sampling algorithm, it can be assumed that the most likely change in pixel stamp values or delta stamp values are 0, −1, −1. Moreover, for a +1 difference in pixel stamp value or delta stamp value between pixels in a n=3 sub-sampling algorithm, it can be assumed that the most likely difference in pixel stamp values or delta stamp values between neighboring pixels is the following: +1, +1, −1. The sub-sampling algorithm can assume that the above sequence of differences is more likely than a sequence of +1, 0, 0 except where the pixel stamp value goes to zero.

An exemplary embodiment of the sub-sampling algorithm can further include similar considerations if the preceding difference in pixel stamp value or delta stamp value is negative and the subsequent difference in pixel stamp value or delta stamp value is positive.

The sub-sampling algorithm can also be capable of dealing with the situation when the actual pixel stamp value is zero. In one exemplary embodiment, the pixel stamp value being zero may be inconsequential if the smallest threshold for implementing stamp functioning to a pixel, for example an input pixel value of 1 or 254 for an 8-bit process, is equal to at least the amount of sub-sampling. In that situation it could not matter because the intermediate extrapolated values cannot be above threshold value. This can occur regardless of the input level.

An exemplary may also include a pixel downscaling logic that can use linear extrapolation to generate intermediate values based on the received differences in pixel stamp values or delta stamp values from the scanline buffer memory. Furthermore, the pixel downscaling logic can use linear extrapolation to generate intermediate difference in pixel stamp values or delta stamp values from the scanline buffer memory. The pixel downscaling logic may include, for example, a plurality of pixel stamp value averaging registers, an adder circuit, a difference in pixel stamp value or delta stamp value averaging multiplier and a sampling circuit. In an exemplary embodiment, the number of pixel averaging registers may be equal to a scaling factor plus one. The downscaling logic may be implemented in, for example, a xerographic apparatus, a scanner, a printer, a copier, a facsimile machine, a computer, or any other device that reproduced loads, outputs and/or stores images.

In one embodiment, the pixel downscaling logic may simply store one out of every (scaling factor) difference between updated pixel stamp values or delta stamp values. As such, other differences in pixel stamp values or delta stamp values may simply be discarded. This may be possible because intermediate differences in pixel stamp values or delta stamp values may be recomputed using the decrementing and extrapolating functions. In addition, such an embodiment may limit the computation required for each pixel. In an alternate exemplary embodiment, the downscaling logic might look at the stamp values for several pixels and the delta stamp value for the previous pixel storage location. These values may be used to anticipate the extrapolation performed in an upscaling circuit so that the resulting reconstruction of the stamps is closer to the originals values before downscaling.

Figure 8:
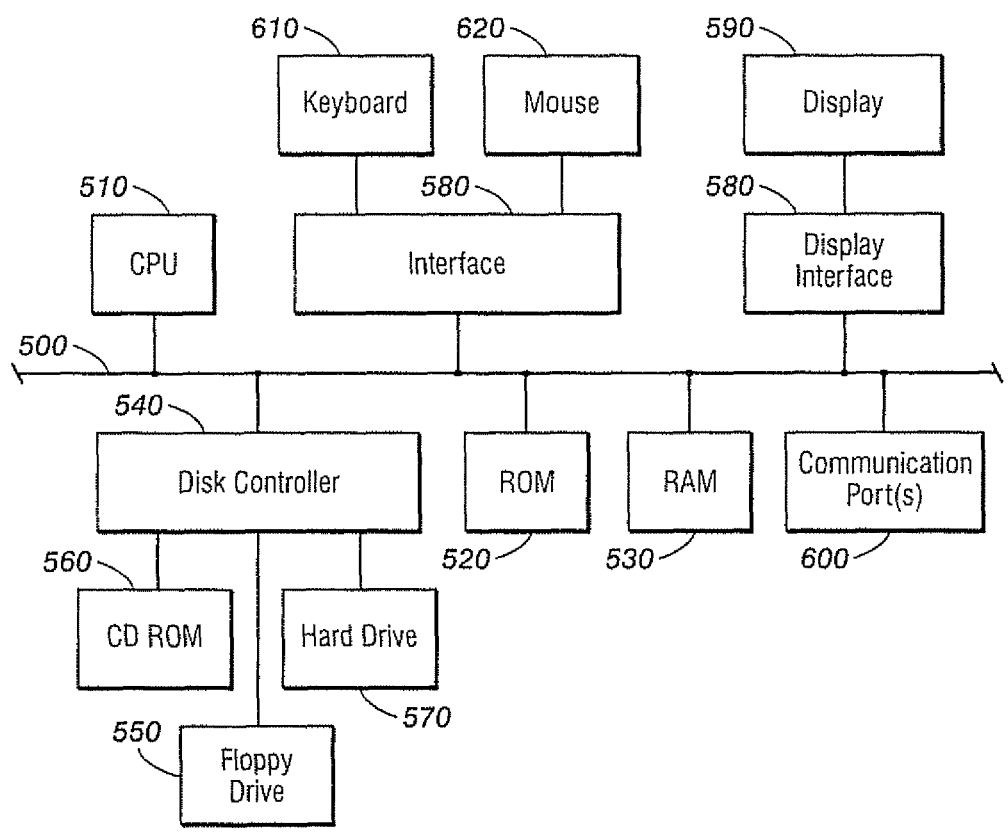
FIG. 8 is a block diagram of an exemplary internal hardware that can use to program instructions according to an embodiment.

FIG. 8 is a block diagram of exemplary internal hardware that may be used to contain or implement the program instructions according to an embodiment. Referring to FIG. 8, a bus 500 may serve as a main information highway interconnecting the other illustrated components of the hardware. CPU 510 can be the central processing unit of the system, performing calculations and logic operations required to execute a program. Read only memory (ROM) 520 and random access memory (RAM) 530 can constitute exemplary types of memory devices.

A disk controller 540 interfaces with one or more optional disk drives to the system bus 500. These disk drives may be external or internal floppy disk drives such as 550, CD ROM drives 560, or external or internal hard drives 570. As indicated previously, these various disk drives and disk controllers are optional devices.

Program instructions may be stored in the ROM 520 and/or the RAM 530. Optionally, program instructions may be stored on a computer readable medium such as a floppy disk or a digital disk or other recording medium, a communications signal or a carrier wave.

An optional display interface 580 may permit information from the bus 500 to be displayed on the display 590 in audio, graphic or alphanumeric format. Communication with external devices may optionally occur using various communication ports 600. An exemplary communication port 600 may be attached to a communications network, such as the Internet or an intranet.

In addition to computer-type components and their equivalents, the hardware may also include an interface 580 that allows for receipt of data from input devices such as a keyboard 610 or another input device 620 such as a remote control, pointer and/or joystick.

A multiprocessor system may optionally be used to perform one, some or all of the operations described herein. Likewise, an embedded system, such as a sub-system within an image processing device, may optionally be used to perform one, some or all of the operations described herein. An image processing device may include one or more of a xerographic apparatus, a scanner, a printer, a copier, a facsimile machine, and any other device that reproduces, loads, outputs and/or stores images. A xerographic apparatus includes a device that performs a xerographic process to imprint a page.

For example, an image processing device may scan, download or otherwise receive an image in, for example, a digital format. The digital format may include one or more pixel intensity values for each pixel in the image. The pixel intensity values may be stored in a memory prior to processing or may be utilized for processing as the image is being scanned. The xerographic apparatus may use a method described above or an equivalent or similar method to determine pixel stamp values as each pixel is processed. The differences in pixel stamp values or delta stamp values may be written to a scanline buffer memory to assist the processing of subsequent scantiness. Upon completion of or during pixel processing, the resulting image may be transferred to, for example, a printing module of the xerographic apparatus, a printer, or any other device for generating a human-readable representation of the image.

It will be appreciated that various of the above-disclosed and other features and functions, or alternatives thereof, may be desirably combined into many other different system or applications. Also, various presently unforeseen or unanticipated alternatives, modifications, variations or improvements therein may be subsequently made by those skilled in the art, and are also intended to be encompassed by the following claims.

What is claimed is:

1. A method for processing image data in an image processing device, the image processing device including an image processing algorithm that can produce processed images that are either stored in a computer readable medium, generated as a physical hardcopy such as a print, or used to display an image, the image data including a plurality of scanlines with each scanline having a plurality of pixel positions, the method comprising:

using a computer memory to store a starting stamp value for the scanline that includes at least one input pixel, the starting stamp value corresponding to a pixel threshold modification value for error diffusion;

using the computer memory to store a plurality of delta stamp values for pixels in the scanline, the delta stamp values each representing a difference in pixel stamp values between two adjacent input pixels in the scanline, the pixel stomp values corresponding to pixel threshold modification values for error diffusion;

receiving an input pixel intensity value for the input pixel;

determining an output pixel intensity value for the input pixel; and determining a pixel stamp value for the input pixel from (1) a pixel stamp value for a previous pixel in the scanline and (2) a delta stamp value for the input pixel, the pixel stamp value relating to a countdown or stamp field method of stamp function, wherein when the output pixel intensity value for the input pixel is equal to a value of a dot in a highlight region or a hole in a shadow region, the stored delta stamp values for at least one adjacent pixel is updated to a predetermined value.

2. The method of claim 1, wherein at the input pixel the dot is printed in the highlight region or the hole is printed in a shadow region, and the pixel stamp value for the input pixel is updated.

3. The method of claim 2, further comprising: updating the plurality of delta stamp values for the plurality of pixel positions having a location previous to or subsequent to the input pixel.

4. The method of claim 2, further comprising: updating the delta stamp value for at least one previously processed pixel in the scanline because the dot or hole was printed at the input pixel.

5. The method of claim 1, wherein if the pixel stamp value for the input pixel is not within a predetermined set range the delta stamp value for the input pixel is updated to a predetermined number and a difference between the predetermined number and the pixel stamp value is carried forward until the pixel stamp value for the input pixel is within the predetermined set range.

6. The method of claim 5, wherein a lower limit of the range is zero.

7. The method of claim 1, wherein only 2 bits are used to store each delta stamp value.

8. The method of claim 1, wherein the starting stamp value is updated by adjusting the starting stamp value by a predetermined number between processing of scanlines.

9. The method of the claim 8, wherein the resolution of the image is different in the slow and fast scan directions and the starting value is updated by the predetermined number such that the ratio of the updating starting value corresponds to the ratio of the fast and slow scan resolutions.

10. The method according to claim 1, wherein determining an output pixel intensity value for the input pixel includes:

determining a modified input pixel intensity value for the input pixel based on information related to a sequence of error values for pixels other than the input pixel;

determining a threshold value for the input pixel; and generating an error diffusion value for the input pixel by comparing the modified input pixel intensity value with the threshold value.

11. The method according to claim 1, further comprising:

calculating a sub-sampled value based on one or more of the stored delta stamp values; and storing the sub-sampled value in a computer readable storage medium.

12. The method of claim 11, wherein only 3 bits are used to store each delta stamp value.

13. The method of claim 2, wherein the pixel stamp value for the input pixel is updated such that the change in pixel stamp value is by an amount that is a fixed number.

14. A system for processing image data in an image processing device, the image processing device including an image processing algorithm that can produce processed images that are either stored in a computer readable medium, generated as a physical hardcopy such as a print, or used to display an image, the image data including a plurality of scanlines with each scanline having a plurality of pixel positions, the system comprising:

means for storing a starting stamp value for the scanline that includes at least one input pixel, the starting stamp value corresponding to a pixel threshold modification value for error diffusion;

means for storing a plurality of delta stamp values for pixels in the scanline, the delta stamp values representing a difference in pixel stamp values between two adjacent input pixels in the scanline, the pixel stamp values corresponding to pixel threshold modification values for error diffusion;

means for receiving an input pixel intensity value for the input pixel;

means for determining an output pixel intensity value for the input-pixel; and means for determining a pixel stamp value for the input pixel from (1) a pixel stamp value for a previous pixel in the scanline and (2) a delta stamp value for the input pixel, the pixel stamp value relating to a countdown or stamp field method of stamp functioning, wherein when the output pixel intensity value for the input pixel is equal to a value of a dot in a highlight region or a hole in a shadow region, the stored delta stamp values for at least one adjacent pixel is updated by a predetermined value.

15. The system of claim 14, wherein at the input pixel-a-det the dot is printed in the highlight region or the hole is printed in the shadow region, and the pixel stamp value for the input pixel is updated.

16. The system of claim 15, further comprising: a means for updating the plurality of delta stamp values for the plurality of pixel positions having a location previous to or subsequent to the input pixel.

17. The system of claim 15, further comprising: a means for updating the delta stamp value for at least one previously processed pixel in the scanline because the dot or hole was printed at the input pixel.

18. The system of claim 14, wherein if the pixel stamp value for the input pixel is not within a predetermined set range the delta stamp value for the input pixel is updated to a predetermined number and a difference between the predetermined number and the pixel stamp value is carried forward until the pixel stamp value for the input pixel is within the predetermined set range.

19. The method of claim 14, wherein only 2 bits are used to store each delta stamp value.

20. The system of claim 14, wherein the starting stamp value is updated by adjusting the starting stamp value by a predetermined number between processing of scanlines.

21. The system of the claim 20, wherein the resolution of the image is different in the slow and fast scan directions and the starting value is updated by the predetermined number such that the ratio of the updating starting value corresponds to the ratio of the fast and slow scan resolutions.

22. The system according to claim 14, further comprising:
a means for calculating a sub-sampled value based on one or more of the stored delta values; and a means for storing the sub-sampled value in a computer readable storage medium.

23. The system of claim 22, wherein only 3 bits are used to store each delta stamp value.

* * * * *